Figure 1:
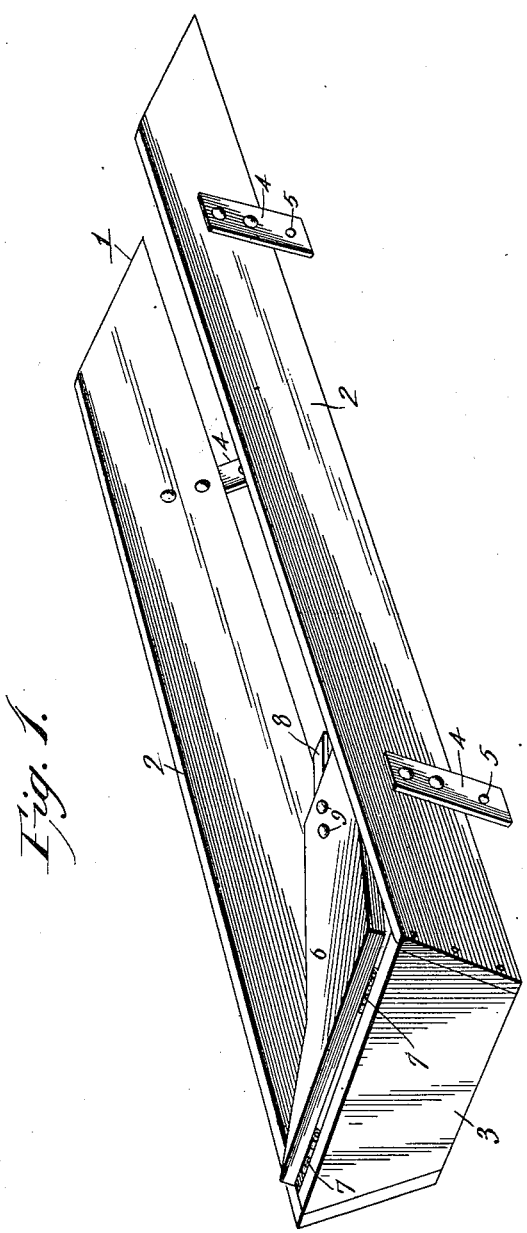

No. 662,105. Patented Nov. 20, 1900.
D. WANDSCHEER.
FEED ATTACHMENT FOR CORN SHELLING MACHINES.
(Application filed Mar. 21, 1900.)
(No Model.) 2 Sheets—Sheet 1.

Witnesses Daniel Wandscheer Inventor
By his Attorneys,

No. 662,105. Patented Nov. 20, 1900.
D. WANDSCHEER.
FEED ATTACHMENT FOR CORN SHELLING MACHINES.
(Application filed Mar. 21, 1900.)
(No Model.) 2 Sheets—Sheet 2.
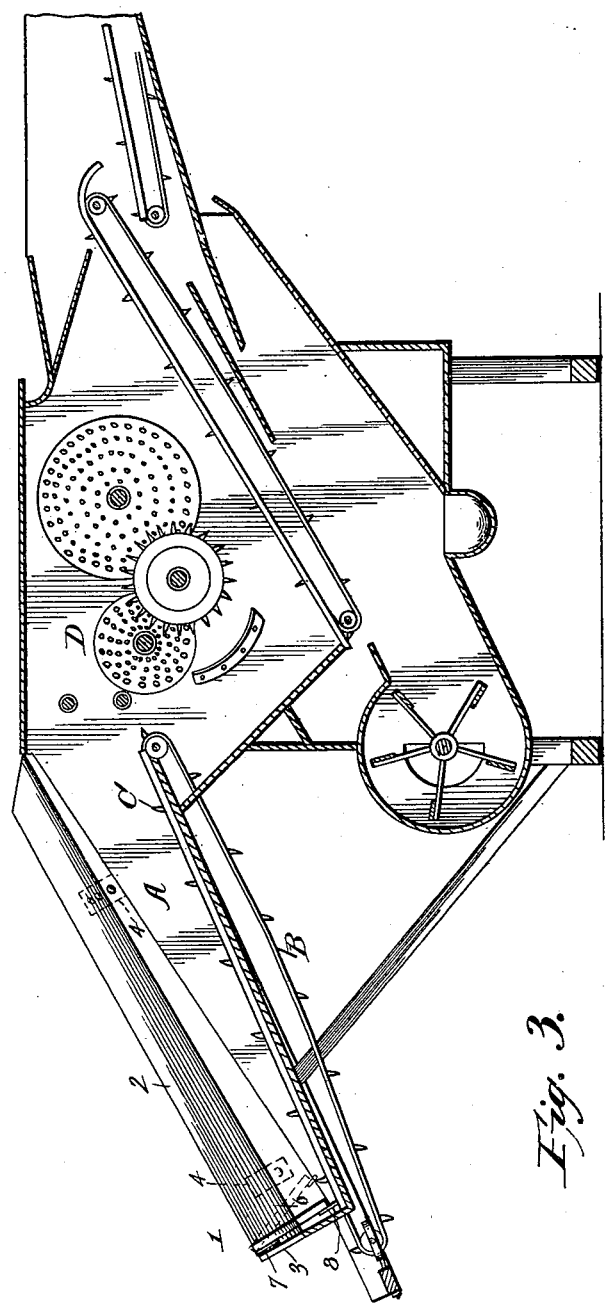
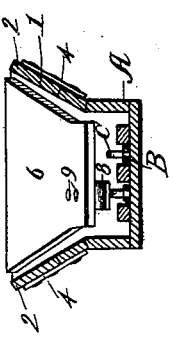
Witnesses
Daniel Wandscheer Inventor
By his Attorneys,

UNITED STATES PATENT OFFICE.

DANIEL WANDSCHEER, OF SIOUX CENTRE, IOWA.

FEED ATTACHMENT FOR CORN-SHELLING MACHINES.

SPECIFICATION forming part of Letters Patent No. 662,105, dated November 20, 1900.

Application filed March 21, 1900. Serial No. 9,576. (No model.)

*To all whom it may concern:*

Be it known that I, DANIEL WANDSCHEER, a citizen of the United States, residing at Sioux Centre, in the county of Sioux and State of Iowa, have invented a new and useful Feed Attachment for Corn-Shelling Machines, of which the following is a specification.

My invention is an improved feed attachment for corn-shelling machines, particularly designed for operation in connection with the machine known as the "Joliet" corn-sheller.

The object of my invention is to provide a simple attachment for the corn-feeder which operates to prevent the corn from lodging in the lower end of the inclined feeder of the shelling-machine, thereby keeping the picker-links of the corn-conveyer clear and preventing the same from becoming clogged and ceasing to operate.

My invention consists in the peculiar construction and combination of devices hereinafter fully set forth, and pointed out in the claims.

In the accompanying drawings, Figure 1 is a perspective view of a feed attachment for corn-shelling machines embodying my improvements, showing the same about to be applied to the feed-trough of a "Joliet" corn-shelling machine. Fig. 2 is a vertical longitudinal sectional view of a Joliet corn-shelling machine provided with my improved feed attachment. Fig. 3 is a vertical transverse sectional view taken on the line *x x* of Fig. 2 and looking in the direction indicated by the arrow.

In the Joliet corn-shelling machine the inclined feeding-trough A, which has upwardly-extending side walls and a lower or front end wall, is provided in its lower side with the inclined endless feed conveyer-chain B, consisting of the picker-links provided with the spurs C, which engage the ears of corn and feed the same to the shelling mechanism, (herein indicated at D.) The feeding mechanism for conveying the ears of corn to the shelling mechanism is defective in this, that when the corn is damp or is supplied to the trough A in considerable quantities the same gravitates to the lower end of the inclined feed-trough A and clogs and lodges upon the conveyer-chain B, so as to cause the same to frequently become inoperative, thereby greatly impairing the efficiency of the machine.

The object of my present improvement is to provide an attachment for the feed mechanism of the Joliet corn-shelling machine, and in the embodiment of my invention I provide a frame 1, which comprises the pair of outwardly-inclined side boards 2, connected together at their lower ends by the end board 3, as shown in detail in Fig. 1. The said frame 1 is of such dimensions as to enable the same to be fitted accurately on the upper edges of the inclined sides of the trough A of the corn-shelling machine, and said boards 2 are provided with metallic straps or links 4, secured thereto on their outer sides, the lower ends of which metallic straps extend downward on the outer sides of the side walls of said feed-trough A and are adapted to be secured thereto by suitable screws or bolts, said lower ends of said straps being for this purpose provided with screw or bolt holes 5.

To the upper side of the end board 3, which bears upon the upper edge of the lower transverse end walls of the trough A, is hinged a vibratory flap 6, the same being of a shape which adapts it to operate between said side walls 2 and the side walls of the inclined feed-trough A, as shown in Figs. 1 and 3, the hinged connections between said vibratory flap and said end board being indicated at 7. Said vibratory flap 6 is provided at its lower free end with an extended tappet-arm 8, which is preferably made of metal and is secured to the under side of said vibratory flap, as by rivets, (indicated at 9,) said tappet-arm projecting beyond said lower free end of said vibratory flap and being disposed in the lower side of the said feed-trough and engaging and bearing upon the upper lead of the endless conveyer-chain B and disposed directly in the path of the spurs C of the picker-links thereof, so that as said spurs, which serve to engage and carry the ears of corn to the shelling mechanism, pass successively under the tappet-arm 8 said flap 6 is raised and lowered by said spurs, and as said spurs pass under and engage said tappet-arm in rapid succession when the corn-shelling machine is in operation vibratory motion is imparted to said flap, as will be readily understood.

The side boards 2 increase the capacity of the feed-trough and enable the same to hold a correspondingly-increased quantity of ears of corn, as will be readily understood, and it will be further understood by reference more especially to Fig. 2 of the drawings that said vibratory flap by being interposed between the side walls of the inclined feed-trough A at the lower end thereof prevents the ears of corn from reaching the lower end of the inclined feed-trough and, moreover, that the vibratory motion of the flap 6 serves effectually to prevent the corn from lodging thereon, with the result that it becomes impossible for the conveyer-chain B to become jammed or clogged with the corn, and said conveyer-chain is rendered at all times efficiently operative, thus greatly enhancing the efficiency and correspondingly increasing the capacity of the corn-shelling machine.

Having thus described my invention, I claim—

1. The combination with the trough and endless conveyer for a feeder for corn-shellers adapted to dispose and deliver the ears endwise to the machine, said trough having upwardly-extending side walls, and a lower or front end wall extending above the plane of the carrying stretch of the conveyer, of a vibratory flap hinged at its upper edge adjacent to said end wall, and having its lower portion adapted to rest upon and be agitated by the feed projections of the conveyer, substantially as described.

2. The attachment for belt feeders for corn-shelling machines, comprising the inclined side boards 2 having the straps or links 4, the end board 3, connecting the lower ends of said inclined side boards, the vibratory flap 6 having its upper side hinged to the upper side of said end board 3, said vibratory flap being provided at its lower side with the projecting tappet-arm 5, and adapted when the attachment is in position, to rest upon and be agitated by the feed projections of the belt, substantially as described.

In testimony that I claim the foregoing as my own I have hereto affixed my signature in the presence of two witnesses.

DANIEL WANDSCHEER.

Witnesses:
GARRIT WANDSCHEER,
WILLIAM VOORDERMAN.